United States Patent [19]

Wang

[11] 4,193,042
[45] Mar. 11, 1980

[54] SELF-CONFINED HOLLOW CATHODE LASER
[75] Inventor: Shing C. Wang, Temple City, Calif.
[73] Assignee: Xerox Corporation, Stamford, Conn.
[21] Appl. No.: 701,474
[22] Filed: Jul. 1, 1976
[51] Int. Cl.² ............................................. H01S 3/00
[52] U.S. Cl. ........................ 331/945 PE; 331/94.5 D; 331/94.5 G
[58] Field of Search .................. 331/94.5 D, 94.5 PE, 331/94.5 G

[56] References Cited
U.S. PATENT DOCUMENTS 3,947,781  3/1976  Hernqvist ........................ 331/94.5 D
4,021,845  4/1977  Wang ..................................... 358/75

Primary Examiner—Martin H. Edlow
Attorney, Agent, or Firm—Franklyn C. Weiss

[57] ABSTRACT

A radiation emission device characterized by a cylindrical cathode enclosed by an elongated envelope having two end sections is disclosed. A pair of anodes, one of which is located along each end section, serves to provide electrical energy to excite material inside the envelope, and to further provide a cataphoretic effect to prevent the excited material from drifting into contact with radiation transmission windows located at the terminus of each end section.

9 Claims, 3 Drawing Figures

U.S. Patent    Mar. 11, 1980    4,193,042
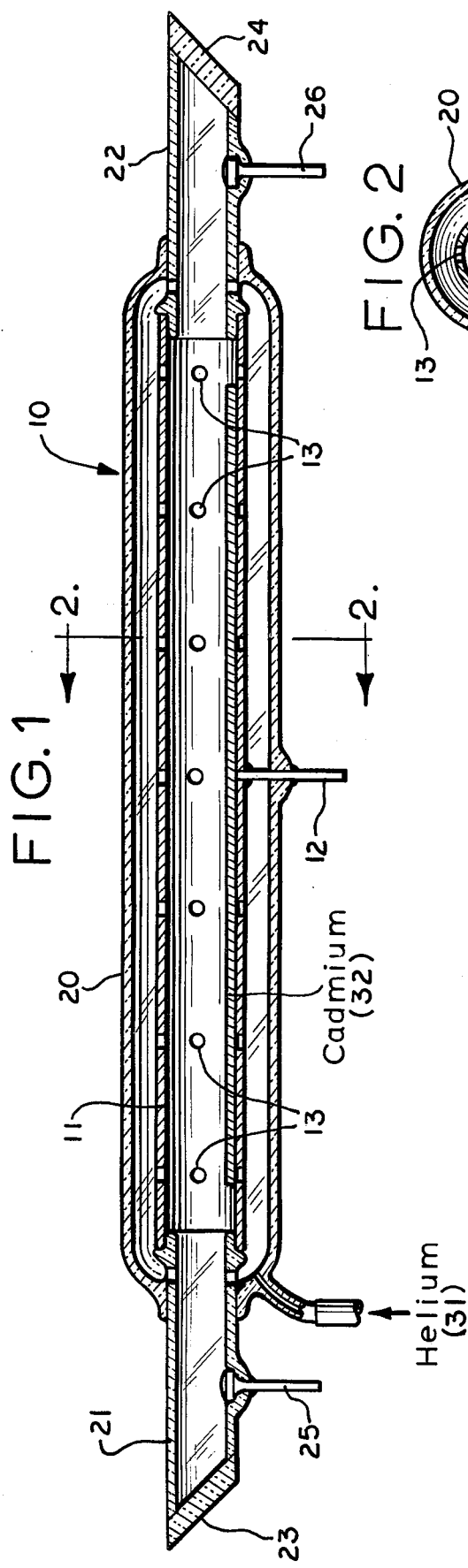
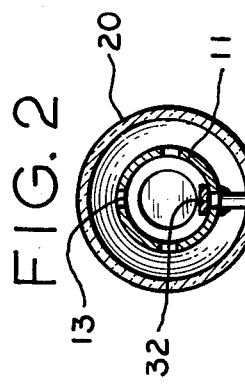
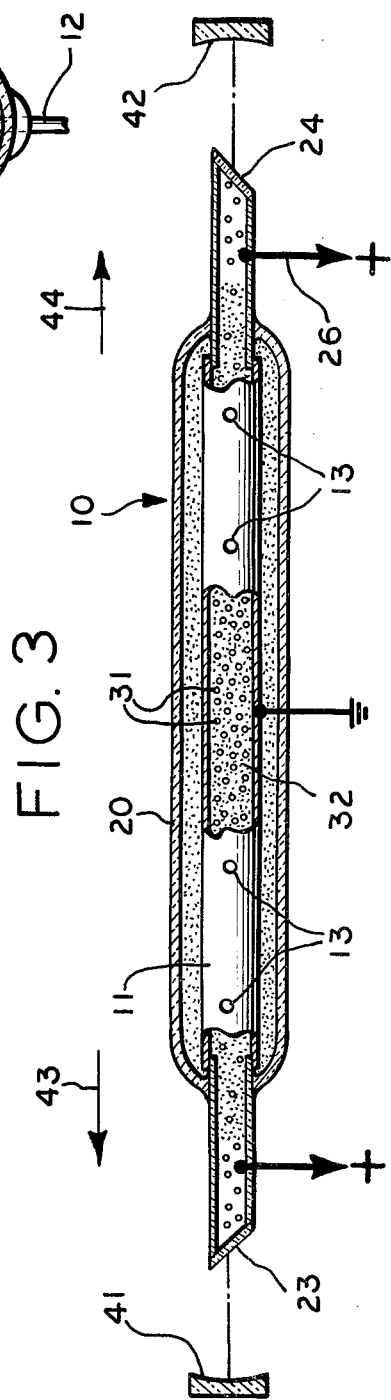

SELF-CONFINED HOLLOW CATHODE LASER

BACKGROUND OF THE INVENTION

This invention relates to radiation emission devices in general, and in particular to radiation emission devices of the type which are frequently referred to as lasers. Lasers are generally characterized by an elongated envelope containing a material which can be raised from an initial energy state to a so-called excited energy state. The particular means used to excite the material in the envelope may vary. Thus, depending on the type of laser used, optical, electrical or chemical excitation means may be employed.

After excitation, radiation may be emitted spontaneously as the excited material returns to a more stable energy level, and/or through stimulated emission. In either case, the wavelength of the radiation so emitted is a function of the quantum drop in the energy level of the excited material. This, in turn, depends upon the inherent characteristics of the material itself.

The radiation, which propagates at a constant wavelength, generally leaves the envelope via radiation transmission means disposed at both ends thereof. The radiation transmission means are typically translucent windows which are often, but not necessarily, inclined at an angle which optimizes a particular polarization of light. This inclination is usually referred to as Brewster's angle, and the windows so inclined are often characterized as Brewster's windows.

Lasers of the type described typically include reflection means such as concave mirrors located a predetermined distance beyond each translucent window. The mirrors are aligned such that the radiation emitted from a translucent window is reflected back into the envelope to stimulate the emission of a substantially increased amount of radiation which then passes through the opposite window. This increased radiation is likewise reflected back into the envelope by the other mirror, thereby increasing the emitted radiation even more. As the radiation is continuously reflected back and forth through the envelope, greater and greater amounts of radiation are produced. It is in this manner that the energy used to initially stimulate the emission of radiation is "amplified" by the laser device. Of course, in order to enable the amplified radiation to escape therefrom, at least one of the mirrors are generally made only partially reflective.

Many different materials may be used to effect radiation emission, including certain members of the class of materials known as metals. Because the metals used in this type of laser must generally be transformed from a normally solid or liquid state, to a gaseous state in order to effect excitation, such lasers are frequently referred to as metal vapor lasers. It is thus clear that in metal vapor lasers, excitation means must be provided which first vaporize the metal and then raise the vaporized metal from an initial energy state to an excited energy state.

Though metal vapor lasers of the type described have been used to emit radiation, it is well known that they can be subject to certain drawbacks. In particular, the vaporized metal tends to condense on the translucent windows located at the ends of the elongated envelope, thereby rendering the windows relatively opaque, and hence less capable of transmitting radiation. In the past, attempts to remedy this problem have included the use of cataphoretic means for establishing an electric field within the laser envelope. The electric field is typically arranged to accelerate the vaporized metal ion away from the region nearest the translucent windows, thereby confining the vaporized metal to the more central portions of the envelope.

Metal vapor lasers have heretofore required relatively complicated, cumbersome, and inefficient apparatus to accomplish both excitation and confinement of the metal. It is therefore an object of this invention to provide an improved laser configuration which achieves these results more economically and more effectively. It is another object of this invention to provide an improved metal vapor laser having combination excitation and cataphoretic means which serve to excite the metal and then confine it within the laser envelope to reduce condensation on the translucent windows. Other objects, features and advantages of the invention, as summarized below, will be apparent upon reading the following detailed description in conjunction with the accompanying drawings.

SUMMARY OF THE INVENTION

In accordance with the foregoing objects, this invention pertains to a device for promoting the emission of radiation. The device comprises a first electrode, and an envelope, substantially surrounding the first electrode, having a pair of end sections each terminating in radiation transmission means. The device further comprises combination excitation and cataphoretic means, disposed in advance of the radiation transmission means, to cause at least some of the material enclosed within the envelope to be raised from an initial state to an excited state, and to further urge some of the material away from the nearest of the radiation transmission means.

DESCRIPTION OF THE DRAWINGS

FIG. 1 is a schematic view of an exemplary embodiment the invention.

FIG. 2 is a sectional view taken across lines 2—2 of FIG. 1.

FIG. 3 is a slightly reduced, partially cutaway schematic view of the embodiment illustrated in FIG. 1, further illustrating the embodiment in operation.

DETAILED DESCRIPTION OF AN EXEMPLARY EMBODIMENT

Referring now to the figures, a device for stimulating the emission of radiation is shown in the form of a laser 10. Laser 10 is comprised of an elongated envelope 20, preferably fabricated from glass. Initially, envelope 20 includes a passage for inserting gaseous material therein, though upon insertion, the envelope is ordinarily hermetically sealed. Envelope 20 includes a pair of end sections 21, 22, each terminating in corresponding radiation transmission means which are referred to hereinafter as windows 23, 24. If it is desired to optimize a particular polarization of light, windows 23, 24 may be inclined at Brewster's angle as indicated in the figures.

Located along each end section 21, 22, in advance of respective windows 23, 24 are a pair of terminals which serve as anodes 25, 26. Anodes 25, 26 extend through envelope 20 and, as shown in FIG. 3, are connected to a source of electrical energy, which in this case, is a positive 300 volt supply. As explained in greater detail hereinafter, anodes 25, 26 are used in combination means for effecting the excitation of material inside envelope 20, as well as for establishing an electric field therein to accelerate the excited material away from the nearest one of windows 23, 24.

Disposed inside glass envelope 20 is a substantially cylindrical, hollow electrode, which in this embodiment serves as a cathode 11. To facilitate the distribution of gaseous material inside envelope 20, cathode 11 may include a number of perforations 13 along its axis. Preferably located midway between the ends of cathode 11 is a terminal 12 which extends through glass envelope 20 where it can be connected to a point of low potential such as ground as shown in FIG. 3. Though cathode 11 can be fabricated from any number of materials, molybdenum is preferred. Moreover, the approximate parameters for the components of laser 10 are as follows: diameter of cathode 11—1 cm., diameter of envelope 20—1-½cm., length of envelope 20—30 cm. It should be observed, however, that these parameters are given for exemplary purposes only, and should not be construed as limitative.

In operation, a preselected doping material which can be excited from an initial energy state to an excited energy state for the purpose of effecting the emission of radiation, and a preselected host material, are inserted within the confines of envelope 20. The particular types and quantities of such material may vary, though in this exemplary embodiment, about 1–2 grams of cadmium metal are placed inside cathode 11 and are used for doping, while gaseous helium at a pressure of approximately 4–10 torrs is inserted within envelope 20 and serves as the host material. The cadmium which, as shown in FIG. 1, is initially in solid form, is identified herein by reference numeral 32, and the helium inserted within envelope 20, is represented herein by reference numeral 31.

When a positive 300 volts are applied to anodes 25, 26, some of the helium atoms 31 become ionized while others are raised to certain excited states. The ionized helium and electrons define a conductive path between anodes 25, 26 and cathode 11. As a result, cathode 11 is heated to a temperature of about 280° C., thereby causing the cadmium placed therein to vaporize.

The vaporized cadmium atoms invariably collide with the helium ions and/or excited state helium to create an energy exchange therebetween. This energy exchange raises the cadmium atoms from their initial energy state to an ionized excited energy state, characterized by a positive electronic charge. Simultaneously, the excited and/or ionized helium returns to its initial state. However, the continuous application of 300 volts at anodes 25, 26 creates a constant supply of ionized and excited helium within envelope 20 to promote further energy exchanges with the vaporized cadmium atoms.

The excited cadmium may return to its initial energy state through spontaneous and/or stimulated emission. In the process of returning to its initial energy state, radiation is emitted at a frequency which is dependent upon the internal properties of the excited material. Thus, for cadmium a characteristic red, green and blue light are emitted through windows 23, 24.

Disposed beyond each of windows 23, 24 is a concave mirror 41, 42 shown in FIG. 3. In a manner well known in the art, mirrors 41, 42 reflect the radiation emitted through windows 23, 24 into envelope 20 to stimulate the emission of increased amounts of radiation. These increased amounts of radiation also pass through windows 23, 24 until they are again reflected back inside envelope 20 by mirrors 41, 42. Thus, as explained above, initially stimulated emission of radiation is "amplified" many times by laser 10. Of course, to allow the "amplified" energy to escape from the device, at least one of mirrors 41, 42 are made only partially reflective.

As explained above, a positive voltage of 300 volts is applied to anodes 25, 26. This positive voltage creates, within envelope 20, electric field gradients identified by reference numerals 43, 44 in FIG. 3. Electric field gradients 43, 44 are directed from cathode 11 towards anodes 25, 26, respectively. Consequently, the areas immediately in advance of windows 23, 24 are more positive than the more central areas of envelope 20. Thus the cataphoretic effect tends to accelerate the positively charged, excited cadmium vapor away from the nearest of windows 23, 24 and toward cathode 11. As a result, the excited cadmium will generally be prevented from drifting too close to windows 23, 24 to condense thereon. Thus, all of the adverse effects that typically result from the condensation of vaporized metal onto windows 23, 24 are mitigated, if not completely eliminated.

In view of the foregoing, it should be apparent that the configuration of laser 10 described above includes combination excitation and cataphoretic means which effectively cause the doping material to be excited from an initial energy state to an excited state, and further substantially prevent the excited doping material from drifting toward and condensing on windows 23, 24. This is achieved, in part, by providing no more than one pair of anodes 25, 26 in advance of windows 23, 24, and a more centrally located cathode 11. As a result, the effects of excitation and cataphoresis can be achieved in a relatively simple, economical and efficient laser device.

Though the exemplary embodiment of the invention herein disclosed is preferred, it will be clear to those skilled in the art that numerous modifications and refinements can be made without departing from the true scope of the invention. Accordingly, all such modifications and refinements are intended to be covered by the appended claims.

I claim:

1. Apparatus for promoting the emission of radiation comprising:

a first cylindrical cathode electrode;

an insulating envelope, substantially surrounding said first electrode, having a pair of end sections, each of said end sections terminating in means for transmitting radiation; said envelope substantially enclosing a quantity of material, said material, at standard temperature and pressure conditions, including both a host material and a doping material, said doping material being cadmium and said host material being helium; and combination excitation and cataphoretic means, disposed in advance of said radiation transmission means at each of said end sections, for promoting passage of electrical energy to said first electrode to cause at least some of said material to be raised from an initial state to an excited state and to further urge said some of said material away from the nearest of said radiation transmission means, said combination excitation and cataphoretic means including anode electrode means having no more than two second electrodes, one of said second electrodes being disposed along one of said end sections in advance of one of said radiation transmission means, and the other of said second electrodes being disposed along the other of said end sections in advance of the other of said radiation transmission means.

2. The apparatus defined in claim 1 wherein said first electrode includes means defining perforations therein.

3. Apparatus for stimulating the emission of radiation by the excitation of metallic material from an initial energy state to an excited energy state comprising:

a substantially cylindrical cathode;

an insulating envelope, substantially surrounding said cathode and being substantially coaxial thereto, having a pair of end sections, each of said end sections terminating in means for transmitting radiation; said envelope being adapted to substantially enclose a quantity of gaseous material and said metallic material, said metallic material being cadmium and said gaseous material being helium; and combination excitation and cataphoretic means including electrode means having no more than two anodes, one of said anodes being disposed along one of said end sections in advance of one of said radiation transmission means, and the other one of said anodes being disposed along the other one of said end sections in advance of the other one of said radiation transmission means; said combination excitation and cataphoretic means, upon receipt of electrical energy at each of said anodes, causing at least a portion of said gaseous material to promote passage of said electrical energy to said cathode for increasing the temperature thereof to vaporize said metallic material, whereby the vaporized metallic material, upon collision with said gaseous material, changes from an initial energy state to an excited energy state; said combination excitation and cataphoretic means, upon receipt of said electrical energy at each of said anodes, further establishing an electrical field within said envelope for urging said vaporized metallic material away from the nearest of said radiation transmission means, thereby minimizing the condensation of said vaporized metallic material on said radiation transmission means.

4. The apparatus defined in claim 3 wherein said first electrode includes means defining perforations therein.

5. A metal vapor laser tube responsive to a predetermined voltage applied thereto for generating a discharge therein comprising:

a gas filled insulating envelope having a longitudinal axis, a hollow cathode located within said envelope, said hollow cathode being coaxially disposed within said envelope, coaxially aligned optically transmissive windows, said windows and said envelope providing a structure for confining a gaseous medium therein, first and second anode electrodes, each positioned in advance of the transmissive windows, said cathode having a center terminal and said anodes each having a terminal extending to the outside of said envelope, wherein a positive voltage supply is applied to each of said first and second anode electrodes and the negative of said voltage supply applied to said cathode terminal to institute the lasing action of said tube and to establish an electric field gradient in said tube to accelerate said metal vapor toward said cathode and away from said transmissive windows.

6. The metal vapor laser tube as set forth in claim 5 wherein said gas in said gas filled envelope comprises helium and said metal vapor is cadmium.

7. The metal vapor laser tube as set forth in claim 6, wherein said applied voltage supply causes the passage of electrical energy from said anodes to said cathode for increasing the temperature thereof to vaporize said cadmium, whereby the vaporized cadmium, upon collision with said helium, changes from an initial energy state to an excited energy state so that said vaporized cadmium is urged, by cataphoretic operation, away from said transmissive windows.

8. The metal vapor laser tube as set forth in claim 7, wherein said hollow cathode is perforated along its axis to facilitate the distribution of said gas and metal vapor.

9. Apparatus for stimulating the emission of radiation by the excitation of metallic material from an initial energy state to an excited energy state comprising:

a substantially cylindrical cathode, said cathode including a terminal, disposed substantially midway between the ends thereof, communicating with the environment outside said envelope;

an envelope, substantially surrounding said cathode and being substantially coaxial thereto, having a pair of end sections, each of said end sections terminating in means for transmitting radiation; said envelope being adapted to substantially enclose a quantity of gaseous material and said metallic material, said metallic material being cadmium and said gaseous material being helium; and combination excitation and cataphoretic means including electrode means having no more than two anodes, one of said anodes being disposed along one of said end sections in advance of one of said radiation transmission means, and the other one of said anodes being disposed along the other one of said end sections in advance of the other one of said radiation transmission means; said combination excitation and cataphoretic means, upon receipt of electrical energy at each of said anodes, causing at least a portion of said gaseous material to promote passage of said electrical energy to said cathode for increasing the temperature thereof to vaporize said metallic material, whereby the vaporized metallic material, upon collision with said gaseous material, changes from an initial energy state to an excited energy state; said combination excitation and cataphoretic means, upon receipt of said electrical energy at each of said anodes, further establishing an electrical field within said envelope for urging said vaporized metallic material away from the nearest of said radiation transmission means, thereby minimizing the condensation of said vaporized metallic material on said radiation transmission means.

* * * * *